Nov. 19, 1940.  H. ROCCABRUNA ET AL  2,222,375

TRAP DOOR FOR FISH BASKETS

Filed Aug. 1, 1938

Inventors
Henry Roccabruna
Louis Bochetto
By L. B. James
Attorney

Patented Nov. 19, 1940

2,222,375

UNITED STATES PATENT OFFICE 2,222,375

TRAP DOOR FOR FISH BASKETS

Henry Roccabruna and Louis Boschetto,
Rock Springs, Wyo.

Application August 1, 1938, Serial No. 222,468

2 Claims. (Cl. 217—124)

This invention relates to a trap door for fish baskets and bait boxes, the general object of the invention being to provide a pair of spring actuated doors for the opening of the basket or box, the parts being so constructed and arranged that fish or bait can be placed in the receptacle without effort, after which the doors close automatically to prevent escape of the fish or bait.

The invention also consists in certain other features of construction, combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which.

Figure 1:
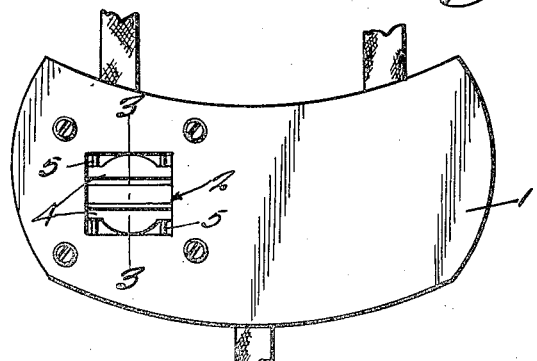
Fig. 1 is a top plan view of the top of a basket, constructed in accordance with this invention.
Figure 3:
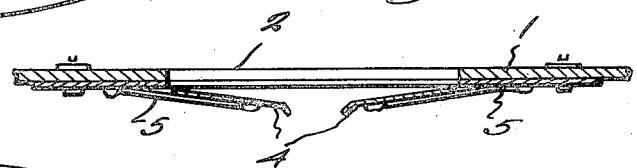
Fig. 3 is a section on line 3—3 of Fig. 1.
Figure 2:
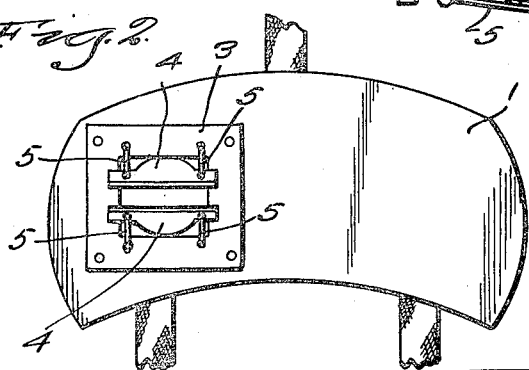
Fig. 2 is a bottom plan view of said top.

Referring to Figs. 1, 2 and 3, the numeral 1 indicates the top of a fish basket and the numeral 2 indicates an opening therein. A plate 3 is fastened to the under face of the top and surrounds the opening. The numeral 4 indicates a pair of doors, each of which is hingedly fastened to the plate by a pair or plurality of spring strips 5 which tend to hold the doors partly closed but which permit the doors to be moved downwardly when pressed upon. As soon as the pressure is removed, the spring strips will close the doors again. The ends of the doors project beyond the opening in the plate and these ends act to limit the upward movement of the doors.

Figure 4:
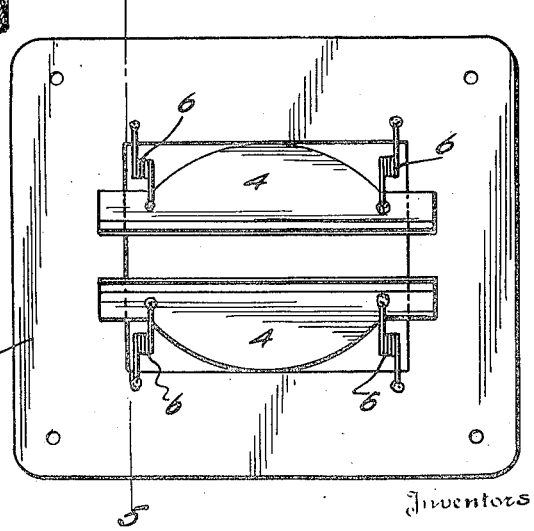
Fig. 4 is a bottom plan view of a supporting plate showing a modification of the invention.
Figure 5:
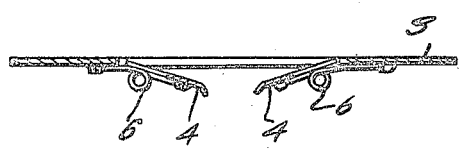
Fig. 5 is a section on line 5—5 of Fig. 4.

In the modification shown in Figs. 4 and 5 coiled springs 6 are used instead of the spring strips to attain the same result as where the spring strips are used.

Thus it will be seen that fish or bait can be easily placed through the opening into the basket or box but as soon as the same passes the doors the springs will move the doors to closing position and thus prevent escape of the fish or bait.

It is thought from the foregoing description that the advantages and novel features of the invention will be readily apparent.

It is to be understood that changes may be made in the construction, combination and arrangement of the several parts, provided such changes fall within the scope of the appended claims.

What we claim and desire to protect by Letters Patent is:

1. A door structure for fish baskets including a plate having a rectangular door opening, a pair of door members arranged in parallelism at opposite sides of said opening with their adjacent edges free and in normally spaced relation, pairs of spring members forming the sole supports of said doors, each spring member extending at right angles to the door and having one extremity fixed to the under side of the door adjacent its free edge and its other extremity fixed to the under side of the plate in spaced relation to the door opening, said springs being arranged to urge the doors upwardly and being free between their extremities.

2. A door structure for fish baskets including a plate having a rectangular door opening, a pair of door members arranged in parallelism at opposite sides of said opening with their adjacent edges free and in normally spaced relation, pairs of spring members forming the sole supports of said doors, each spring member extending at right angles to the door and having one extremity fixed to the under side of the door adjacent its free edge and its other extremity fixed to the under side of the plate in spaced relation to the door opening, said springs being arranged to urge the doors upwardly and being free between their extremities, each of said doors having extensions on its free edge portion projecting beneath the plate at the side edges of the opening and having a laterally reduced portion between said side edges of the opening and spaced from said side edges, the springs having coiled portions lying in the spaces between the reduced portions of the doors and the side edges of the opening.

HENRY ROCCABRUNA.
LOUIS BOSCHETTO.